(12) United States Patent
Nishimura

(10) Patent No.: US 11,544,276 B2
(45) Date of Patent: Jan. 3, 2023

(54) SEARCH DEVICE, METHOD AND PROGRAM RECORDING MEDIUM

(71) Applicant: NEC CORPORATION, Tokyo (JP)

(72) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 174 days.

(21) Appl. No.: 16/690,449

(22) Filed: Nov. 21, 2019

(65) Prior Publication Data

US 2020/0089686 A1 Mar. 19, 2020

Related U.S. Application Data

(63) Continuation of application No. 15/303,965, filed as application No. PCT/JP2015/002363 on May 11, 2015, now Pat. No. 10,885,043.

(30) Foreign Application Priority Data

May 15, 2014 (JP) ................................. 2014-101024

(51) Int. Cl.
*G06F 16/22* (2019.01)
*G06F 16/245* (2019.01)
*G06F 16/242* (2019.01)
*G06F 16/2457* (2019.01)

(52) U.S. Cl.
CPC ........ *G06F 16/24578* (2019.01); *G06F 16/22* (2019.01); *G06F 16/2425* (2019.01)

(58) Field of Classification Search
None
See application file for complete search history.

(56) References Cited

U.S. PATENT DOCUMENTS 6,094,652 A * 7/2000 Faisal ................. G06F 16/3322
707/999.005
6,182,038 B1 * 1/2001 Balakrishnan .......... G06F 16/24
9,063,972 B1 * 6/2015 Marra .................... G06F 16/245
(Continued)

FOREIGN PATENT DOCUMENTS

JP H11-328203 A 11/1999
JP 2000-137725 A 5/2000
(Continued)

OTHER PUBLICATIONS

Communication dated Sep. 18, 2020, from the United States Patent and Trademark Office in U.S. Appl. No. 15/303,965.
Japanese Office Action for JP Application No. 2020-013944 dated Mar. 9, 2021 with English Translation.
Masui, "LensBar—Visualization for Browsing and Filtering Large Lists of Data", lecture note / Software 21, Interactive System and Software VI, Japan, Modern Scientific Co., Ltd., Dec. 20, 1998, pp. 153-158.

(Continued)

*Primary Examiner* — Son T Hoang
(74) *Attorney, Agent, or Firm* — Sughrue Mion, PLLC

(57) ABSTRACT

To provide search results to be presented in accordance with changes in the state of search performed by a user. A search device includes: a search means that searches a storage means storing records for records that match an input search condition to not less than a set relevance level and outputs search results; and a specificity inference means that, when a user operation is input after the search means has output search results corresponding to a first search condition, infers whether or not specificity of the search results is acceptable on the basis of the user operation, and, when the specificity is inferred to be acceptable, raises a relevance level that the search means uses.

12 Claims, 5 Drawing Sheets

(56) References Cited

U.S. PATENT DOCUMENTS

| | | | |
|---|---|---|---|
| 2003/0212666 A1* | 11/2003 | Basu | G06F 16/3338 |
| 2005/0010553 A1 | 1/2005 | Liu | |
| 2006/0167896 A1* | 7/2006 | Kapur | G06F 16/9535 |
| 2006/0206454 A1 | 9/2006 | Forstall et al. | |
| 2007/0136264 A1 | 6/2007 | Tran | |
| 2007/0156647 A1* | 7/2007 | Shen | G06F 16/9535 |
| 2007/0214122 A1 | 9/2007 | Bala | |
| 2008/0133505 A1* | 6/2008 | Bayley | G06F 16/34 |
| 2008/0222131 A1 | 9/2008 | Wang | |
| 2009/0171907 A1 | 7/2009 | Radovanovic | |
| 2009/0282023 A1 | 11/2009 | Bennett | |
| 2010/0010984 A1 | 1/2010 | Matias | |
| 2010/0070523 A1 | 3/2010 | Delgo et al. | |
| 2010/0121840 A1* | 5/2010 | Murdock | G06F 16/3346 703/13 |
| 2010/0153885 A1* | 6/2010 | Yates | G06F 16/738 707/723 |
| 2010/0211579 A1 | 8/2010 | Fujioka | |
| 2010/0325035 A1 | 12/2010 | Hilgers et al. | |
| 2011/0202521 A1 | 8/2011 | Coleman | |
| 2011/0225145 A1* | 9/2011 | Greene | G06F 16/3326 707/722 |
| 2012/0084283 A1 | 4/2012 | Chitiveli et al. | |
| 2013/0144864 A1 | 6/2013 | Noble et al. | |
| 2013/0167059 A1* | 6/2013 | Legris | G06F 16/90335 |
| 2013/0282696 A1* | 10/2013 | John | G06F 16/951 707/E17.014 |
| 2014/0181084 A1 | 6/2014 | Herron | |
| 2014/0214813 A1 | 7/2014 | Braham et al. | |

FOREIGN PATENT DOCUMENTS

| | | | | |
|---|---|---|---|---|
| JP | 2002-073676 A | 3/2002 | | |
| JP | 2005-209210 A | 8/2005 | | |
| JP | 3896383 B1 | 3/2007 | | |
| JP | 2008-003721 A | 1/2008 | | |
| JP | 2009-075630 A | 4/2009 | | |
| JP | 2012-248020 A | 12/2012 | | |
| WO | WO-02063514 A2 * | 8/2002 | | G06F 16/951 |
| WO | 2014/057529 A1 | 4/2014 | | |

OTHER PUBLICATIONS

Igarashi et al, "Speed-dependent Automatic Zooming for Efficient Document Navigation", lecture note / Software 24, Interactive System and Software VIII, Japan, Modern Scientific Co., Ltd., Dec. 20, 2020, pp. 57-66.

International Search Report of PCT/JP2015/002363 dated Aug. 4, 2015.

Ivar Jacobson et al., "The Essence of Software Engineering: The SEMAT Kernel", ACM queue, 2012, pp. 40, vol. 10, No. 10.

Office Action dated Mar. 3, 2020 in U.S. Appl. No. 15/303,965.

U.S. Office Action for U.S. Appl. No. 16/690,313 dated Jul. 9, 2021.

Japanese Office Action for JP Application No. 2020-013944 dated May 25, 2021 with English Translation.

U.S. Office Action for U.S. Appl. No. 16/690,313, dated Jul. 8, 2022.

* cited by examiner

SEARCH DEVICE, METHOD AND PROGRAM RECORDING MEDIUM

CROSS REFERENCE TO RELATED APPLICATIONS

This application is a Continuation Application of U.S. application Ser. No. 15/303,965, filed Oct. 13, 2016, which is a National Stage of International Application No. PCT/JP2015/002363, filed May 11, 2015, claiming priority based on Japanese Patent Application No. 2014-101024, filed May 15, 2014, the contents of all of which are incorporated herein by reference in their entirety.

TECHNICAL FIELD

The present invention relates to a search device, method, and program recording medium, and particularly relates to a search device, method, and program recording medium that enable target data to be found quickly.

BACKGROUND ART

A search system is a system that, when a search condition, such as a keyword, is input, searches a database and the like for a record of data matching the condition and outputs search results. In a search on the basis of a similarity to a search condition, there is a case in which a lot of records are output. In this case, users are required to find a target record out of a lot of records. The patent literatures cited below disclose technologies for solving this problem.

PTL 1 discloses a device that records information, such as the number of hits in a performed search. When a new search is performed, the device changes a search condition by appending information described above to an input keyword to improve search accuracy.

PTL 2 discloses a server that calculates relevance levels for search results, integrates search results having high relevancy, and outputs the integrated search results to reduce the number of outputs.

PTL 3 discloses a system that searches documents. In the first round of search, the system outputs a document list on the basis of similarities to a given search condition, and, subsequently, obtains, from a user, a result of classification of documents included in the list and stores the classification result. In the second round of search, the system classifies search results based on the stored classification result to improve search accuracy.

CITATION LIST

Patent Literature

[PTL 1] JP 2002-073676 A
[PTL 2] JP 3896383 B1
[PTL 3] JP 2009-075630 A

Non Patent Literature

[NPL 1] Ivar Jacobson, Pan Wei Ng, Paul E. Mcmahon, Ian Spence, Svante Lidman, The Essence of Software Engineering: The SEMAT Kernel, ACM queue, vol. 10, No. 10, pp. 40, 2012

SUMMARY OF INVENTION

Technical Problem

In a search system, when there are a lot of matching records corresponding to a search condition specified by a user, presenting narrowed-down results is indispensable for improving user convenience. The narrowing down is required to be performed in accordance with the state of search performed by the user. However, the state of search performed by the user sometimes changes in a series of searches.

For example, there is a case in which a user in a police department searches a lot of images captured by monitoring-cameras for a suspect. First, the user, on the basis of an eyewitness testimony, searches for a person clad in "red clothes". At this time, since the user is unable to specify what type of "red clothes" the search target is clad in, it is preferable to provide search results having high comprehensiveness for a variety of red colors. On the other hand, after the "red clothes" which the suspect was clad in have been specified, to track the movements of the person, it is preferable that only images of persons who are clad in the specified "red clothes" be presented. If a lot of images of persons who are clad in a variety of "red clothes" are presented, search results become occupied by images of persons other than the target person.

In other words, in a series of works of searching images in which "red clothes" are imaged, the state of search, that is, the degree of requirement for narrowing down search results against a search target, sometimes changes. It is preferable that a search system presents search results in accordance with a changed state of search.

However, the technologies disclosed in the above-described patent literatures have been incapable of presenting search results in accordance with changes in the state of search performed by a user.

An object of the present invention is to provide a search device, method, and program recording medium that solve the above-described problem.

Solution to Problem

A search device relating to an exemplary embodiment of the present invention, includes: a search means for searching a storage means storing records for records that match an input search condition to not less than a set relevance level and outputs search results; and a specificity inference means for, when a user operation is input after the search means has output search results corresponding to a first search condition, inferring whether or not specificity of the search results is acceptable on the basis of the user operation, and, when the specificity is inferred to be acceptable, raising a relevance level that the search means uses.

A search method relating to an exemplary embodiment of the present invention includes: searching a storage means storing records for records that match a first input search condition to not less than a set relevance level and outputting search results; and when a user operation is input after the search results have been output, inferring whether or not specificity of the search results is acceptable on the basis of the user operation, and, when the specificity is inferred to be acceptable, raising the relevance level that is used for search. A computer-readable recording medium relating to an exemplary embodiment of the present invention, stores a program that causes a computer to execute: search processing of searching a storage means storing records for records that match an input search condition to not less than a set relevance level and outputting search results: and specificity inferring processing of, when a user operation is input after the search means has output search results corresponding to a first search condition, inferring whether or not specificity of the search results is acceptable on the basis of the user operation, and, when the specificity is inferred to be acceptable, raising a relevance level that is used in the search processing.

Advantageous Effects of Invention

A search device according to the present invention enables search results to be presented in accordance with changes in the state of search performed by a user. As a result, users are able to reduce the efforts to confirm search results.

DESCRIPTION OF EMBODIMENTS

First Exemplary Embodiment

Figure 1:
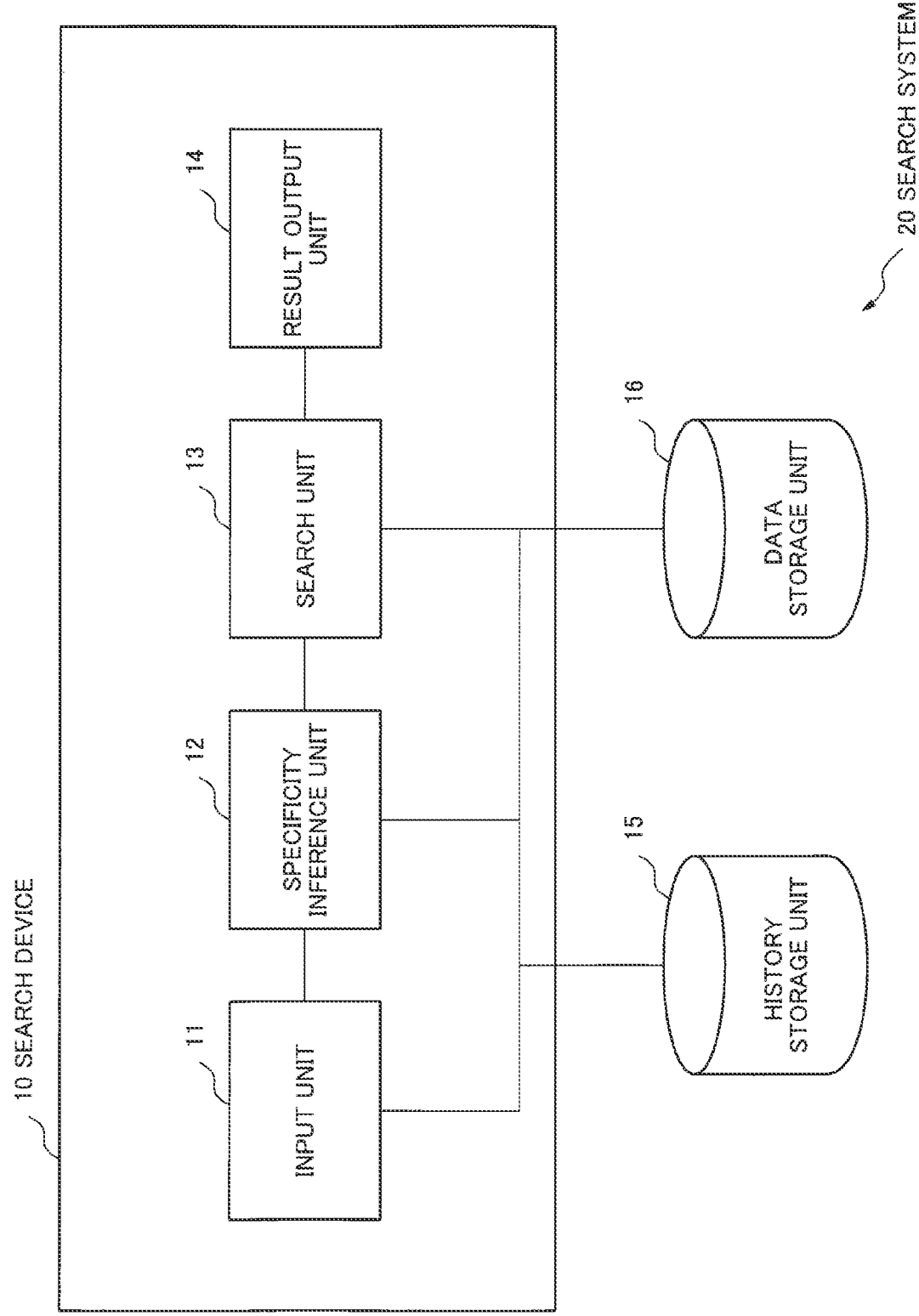
FIG. 1 is a structural diagram of a search system 20 of a first exemplary embodiment of the present invention.

FIG. 1 is a structural diagram of a search system 20 of a first exemplary embodiment of the present invention. The search system 20 includes a search device 10, a history storage unit 15, and a data storage unit 16. The search device 10 includes an input unit 11, a specificity inference unit 12, a search unit 13, and a result output unit 14. The search device 10 is connected to the history storage unit 15 and the data storage unit 16.

The search device 10 receives a search condition from a terminal device (not illustrated) that a user operates, searches the data storage unit 16, extracts records that match the search condition, and displays the extracted records on the terminal device. The data storage unit 16 stores data records subjected to search. Data records are, for example, image data imaged by monitoring cameras.

In a series of searches in which the user searches for a target record, the search device 10 displays search results having high comprehensiveness at first, and, as the searches progress and candidate records are narrowed down sufficiently, outputs search results having high accuracy.

A search condition that the search device 10 receives is described in, for example, SQL (Structured Query Language). A search condition contains values or ranges of values of one or more condition items. For example, with respect to a time item, a search condition contains a value of 9 o'clock. For example, with respect to a color item, a search condition contains specific GBR values. For example, with respect to an address item, a search condition contains a specific name(s) of prefecture, city, ward, and/or district.

The input unit 11 receives, from the terminal device, a message including a search condition that the user has specified. The search unit 13 searches the data storage unit 16 to extract records that match the search condition. The result output unit 14 outputs the extracted records to the terminal device as search results.

The search unit 13 has a relevance level set therein and extracts, from the data storage unit 16, records that match the search condition to not less than the set relevance level. The relevance level is an index that indicates closeness or a similarity to the search condition. The relevance level may be set with respect to each condition item or a plurality of condition items. With regard to the color, for example, when "red" is specified in a condition item, ranges of strength of blue and green that a color in a record may contain are specified as the relevance level. The relevance level may be a range of time or a range of temperature. The relevance level may be specification of a range of addresses, such as within the same prefecture and adjacent towns.

There exist a plurality of relevance levels encompassing from a high relevancy to a low relevancy. When a high relevancy is set, the search unit 13 extracts records within a narrow range centered around the search condition. That is, the search unit 13 outputs search results having high accuracy. When a low relevancy is set, the search unit 13 extracts records within a wide range centered around the search condition. That is, the search unit 13 outputs search results having high comprehensiveness.

The specificity inference unit 12, on the basis of a user operation performed on the last search results, infers a degree of narrowing down (specificity) of the search results toward a record targeted in the search. When the specificity is inferred to be not less than a predetermined value, the specificity inference unit 12 raises the relevance level. That is because it can be determined that candidates have been narrowed down sufficiently as the search progresses.

The history storage unit 15 stores, for example, a history of search conditions used in searches, search results, and operations performed by the user on the search results. Operations performed by users on search results include, for example, scrolling, page feeding, copying and pasting to a search condition, and printing.

When a lot of records are contained in search results, the result output unit 14, for example, divides the search results into pages and displays each page at a time on the terminal device. While displaying the output pages successively, the user performs a subsequent operation, such as looking for the target record and considering a next search condition to improve the accuracy of search results. The page feeding means, as described above, displaying a plurality of pages of search results successively. The result output unit 14 may display search results as large continuous data, instead of dividing the search results into pages. In this case, the user scrolls screens in place of feeding pages.

The input unit 11, the specificity inference unit 12, the search unit 13, and the result output unit 14 are configured with logical circuits. The input unit 11, the specificity inference unit 12, the search unit 13, or the result output unit 14 may be achieved by a program that is stored in a memory of the search device 10, which is a computer, and executed by a processor of the computer. The history storage unit 15 and the data storage unit 16 are storage devices, such as a disk device.

Figure 2:
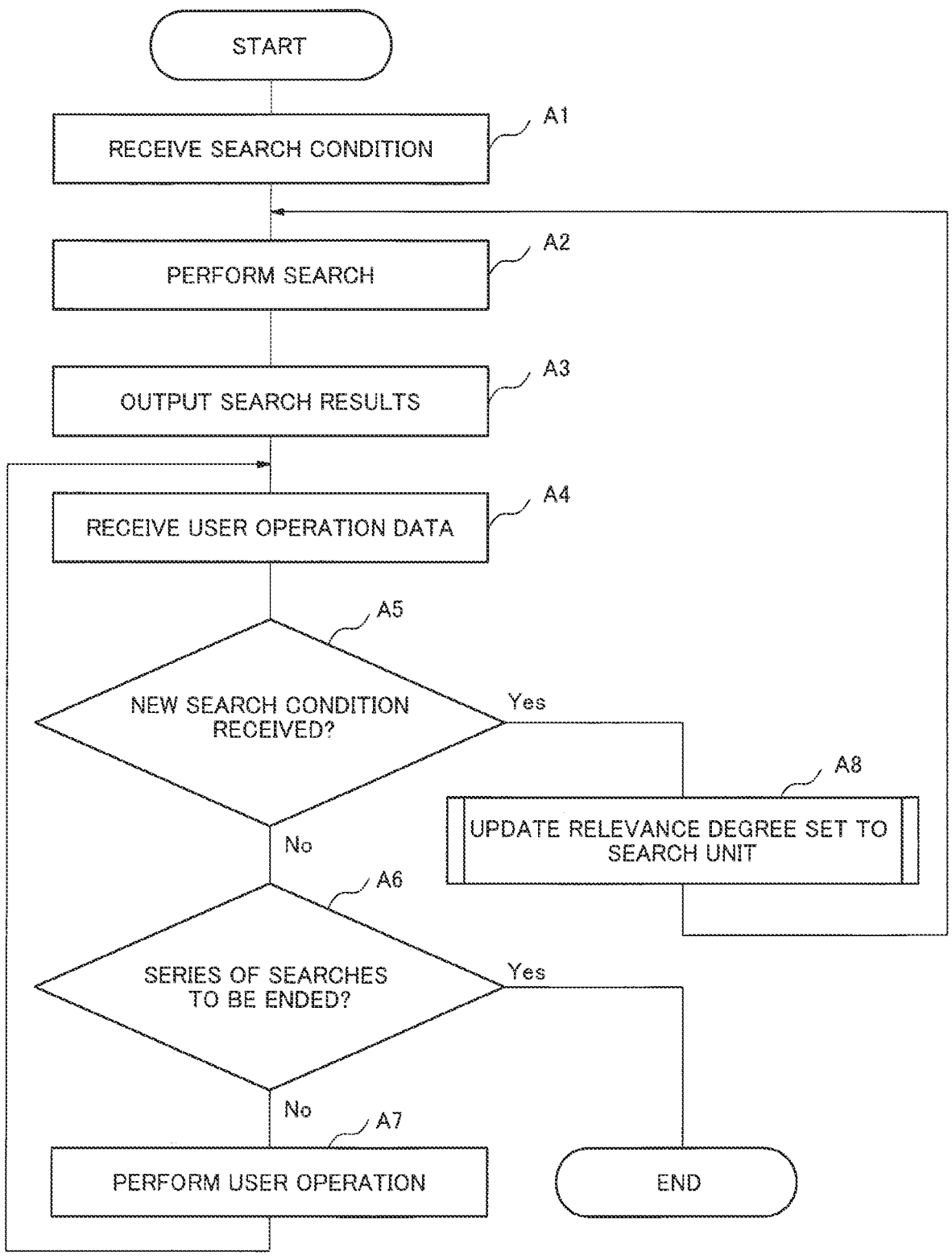
FIG. 2 is an operation flowchart of a search device 10.

FIG. 2 is an operation flowchart of the search device 10. At an initial state when a series of searches is started, a low relevancy is set to the search unit 13.

When a user inputs a search condition from a terminal device, the input unit 11 receives the input search condition (A1). If the input search condition is an input of an initial search condition in the series of searches, the search unit 13 searches the data storage unit 16 using the search condition and extracts a range of records that satisfy the set relevance level (A2). That is, at an initial stage of the series of searches, the search unit 13 performs extraction that satisfies a low relevancy and is characterized by high comprehensiveness. The result output unit 14 outputs the extracted records to the terminal device as search results (A3). At this time, the search unit 13 stores the search condition used in the search and the search results in the history storage unit 15.

The user examines the output search results to determine whether or not the search results have been narrowed down sufficiently. When the search results are determined to have been narrowed down sufficiently, the user may try to find a target record out of the search results visually.

When the narrowing down is off-target, the user may change the search condition so as to change the range of narrowing down to another portion. When the course of narrowing down is right but the narrowing down itself is insufficient, the user may narrow the range of values of a search item. For example, the user may change specification of an address item from specification at the prefecture level to specification at the municipality level.

When the search condition has been broad from the beginning and another search condition enabling strictly narrowing down records is found based on data in the search result, the user may replace the search condition with the data. In the case of the search for "red clothes" described afore, the user, in the initial search, specifies a color selected from a color palette presented by the system for a color item in a search condition. When a target person is identified from the first search results, the user may copy and paste a specification for the color item from pixel data of an image in the first search results to a new search condition.

When the narrowing down in the initial search is off-target and insufficient, the user may examine a lot of displayed search results to determine what types of nonessential data are included, and consider a search condition essential for performing an appropriate narrowing down. In the examination and consideration, the user may use the afore-described page feeding and scrolling frequently.

The input unit 11 of the search device 10 receives such operation data of the user and stores the operation data into the history storage unit 15 (A4). When the received operation data of the user are an input of a new search condition (Yes in A5), the specificity inference unit 12 updates the relevance level that has been set to the search unit 13 (A8, details will be described later). Subsequently, the specificity inference unit 12 performs a search using the new search condition (returns to A2). At this time, the search unit 13 uses the updated relevance level. When the relevance level is raised, the search unit 13 performs extraction characterized by lower comprehensiveness but higher accuracy than in the last search. When the relevance level is lowered, the search unit 13 performs extraction characterized by lower accuracy but higher comprehensiveness than in the previous search.

When the operation data of the user that the input unit 11 has received is neither an input of a new search condition nor an ending instruction of the series of searches (No in both A5 and A6), the result output unit 14, for example, performs the user operation, for example, page feeding (A7). After having performed the user operation, the input unit 11 performs reception of next user operation data (returns to A4).

When the operation data of the user that the input unit 11 has received is an ending instruction of the series of searches (Yes in A6), the search device 10 ends the series of searches.

Figure 3:
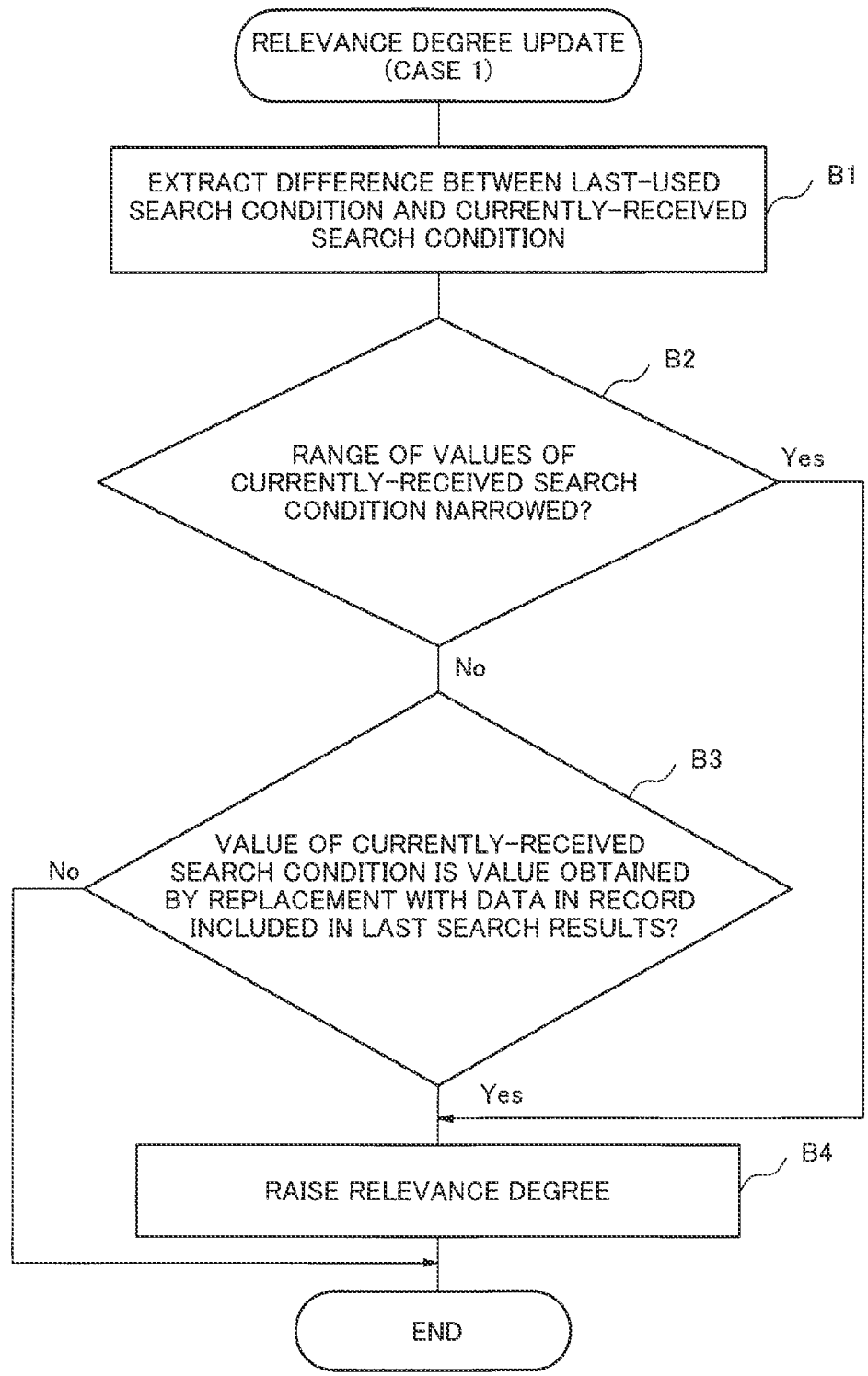
FIG. 3 is an operation flowchart of update of a relevance level (case 1) that a specificity inference unit 12 performs.

FIG. 3 is an operation flowchart of update of the relevance level (case 1) that the specificity inference unit 12 performs. The specificity inference unit 12 compares a search condition used in the last search with a new search condition received in the current search to extract a difference therebetween (B1). The specificity inference unit 12 obtains the search condition used in the last search from the history storage unit 15.

With respect to all condition items that have differences, when the range of specified values in the new search condition received in the current search has been narrowed (Yes in B2), the specificity inference unit 12 raises the relevance level (B4). Raising the relevance level is equivalent to, for example, selecting a relevance level that is higher than the relevance level that has been currently set out of a plurality of relevance levels and setting the selected relevance level.

When the value of a condition item in the search condition received in the current search is a value obtained by replacement with data in a record included in the last search results (Yes in B3), the specificity inference unit 12 also raises the relevance level (B4). The specificity inference unit 12 obtains the last search results from the history storage unit 15.

When it is determined to be No in both B2 and B3, the specificity inference unit 12 does not update the relevance level. In this case, the specificity inference unit 12 may lower the relevancy. That is because the search condition has not converged yet, and the search may have strayed.

For example, when a requirement of a color represents a value that is selected from data prepared as a reference, such as a color palette, it is inferable that the user is not provided with sufficient information on the search target. Therefore, the search device 10 lowers the relevance level to output results having high comprehensiveness. When a requirement of a color is represents the value of data in a record that has already been presented to the user, it is inferable that the user is provided with sufficient information on the search target. In this case, the search device 10 raises the relevance level to output results having high accuracy.

When the user has loosened the search condition, it is inferable that the user has not been able to identify the search target. Therefore, the search device 10 outputs results having high comprehensiveness. On the other hand, when the user has tightened the search condition, it is inferable that the user is in the process of identifying the search target. In this case, the search device 10 outputs results having high accuracy.

Figure 4:
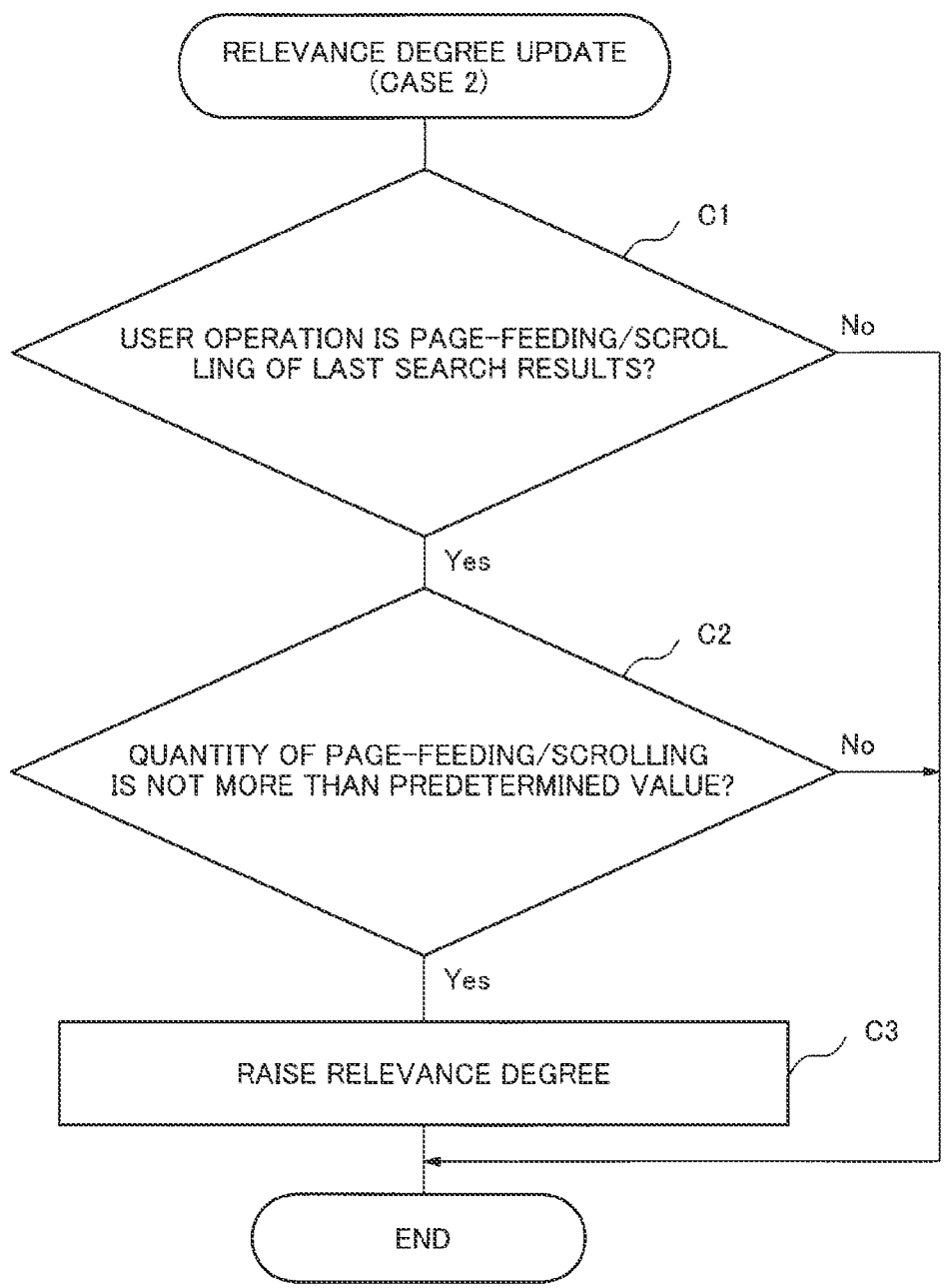
FIG. 4 is an operation flowchart of update of a relevance level (case 2) that the specificity inference unit 12 performs.

FIG. 4 is an operation flowchart of update of the relevance level (case 2) that the specificity inference unit 12 performs. When an operation that the user has performed before inputting a new search condition is page feeding or scrolling of the last search results (Yes in C1) and the quantity of page feeding or scrolling is not more than a predetermined value (Yes in C2), the specificity inference unit 12 raises the relevance level (C3). The specificity inference unit 12 obtains the operation data of the user from the history storage unit 15.

When an operation that the user has performed before inputting a new search condition is page feeding or scrolling of the last search results (Yes in C1) and the quantity of page feeding or scrolling is larger than the predetermined value (No in C2), the specificity inference unit 12 does not change the relevance level. In this case, the specificity inference unit 12 may lower the relevancy. The predetermined value has been set to the search device 10 in advance by an administrator.

When the quantity of page feeding or scrolling of the search results is large, it is inferable that narrowing down has not progressed as intended and providing search results having high comprehensiveness is thus preferable. Conversely, when the quantity of page feeding or scrolling of the search results is small, it is inferable that narrowing down has progressed as intended and providing search results having high accuracy is thus preferable.

Variation of First Exemplary Embodiment

In the first exemplary embodiment, the search unit 13 switches a plurality of relevance levels to perform searches. The search unit 13 may include, inside thereof, a plurality of sub-search units (not illustrated), each of which performs a search using the relevance level, and be configured to select a sub-search unit in accordance with a set relevance level to perform a search.

When a low relevancy is set, the search unit 13 has a high probability of extracting a lot of records. In this case, the search unit 13 may make a single record represent records that are excessively similar to each other and output the single record. This configuration is enabled by, when a record that satisfies a relevance level corresponding to a search condition is newly found, calculating a similarity to a record(s) that has/have already been listed as a search result(s) and, when the similarity is not less than a predetermined threshold value, excluding the newly found record from the search result(s). The similarity is, for example, defined to be a total sum of ratios of differences in data relating to respective condition items.

Advantageous Effect

The search device 10 is capable of presenting search results in accordance with changes in the state of search performed by a user. As a consequence of the capability, the user is able to reduce the effort in confirming search results. That is because the specificity inference unit 12, when it is inferred that results of a search performed last have been acceptably narrowed down, sets a high relevance level. As a result, the search device 10 outputs search results having high comprehensiveness at first and outputs search results having high accuracy as records are narrowed down.

Second Exemplary Embodiment

Figure 5:
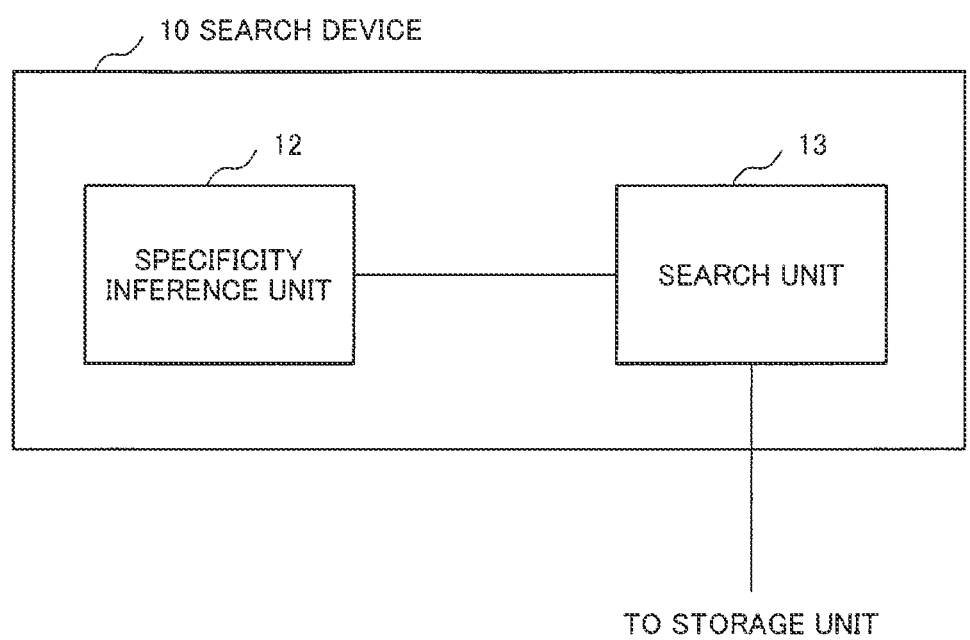
FIG. 5 is a structural diagram of a search device 10 of a second exemplary embodiment of the present invention.

FIG. 5 is a structural diagram of a search device 10 of a second exemplary embodiment of the present invention. The search device 10 includes a specificity inference unit 12 and a search unit 13.

The search unit 13 searches a storage unit storing records for records that match an input search condition to not less than a set relevance level and outputs search results. The specificity inference unit 12, when a user operation is input after the search unit 13 has output search results corresponding to a first search condition, infers whether or not specificity of the search results is acceptable on the basis of the user operation, and, when the specificity is inferred to be acceptable, raises a relevance level that the search unit 13 uses.

The search device 10 is capable of presenting search results in accordance with changes in the state of search performed by a user. As a consequence of the capability, the user is able to reduce the effort in confirming search results. That is because the specificity inference unit 12, when it is inferred that results of a search performed last have been acceptably narrowed down, sets a high relevance level.

The present invention was described above through exemplary embodiments thereof, but the present invention is not limited to the above exemplary embodiments. Various modifications that could be understood by a person skilled in the art may be applied to the configurations and details of the present invention within the scope of the present invention.

REFERENCE SIGNS LIST

10 Search device
11 Input unit
12 Specificity inference unit
13 Search unit
14 Result output unit
15 History storage unit
16 Data storage unit
20 Search system

The invention claimed is:

1. A search system comprising:
at least one memory storing instructions and records; and
at least one processor configured to process the instructions to perform:
receiving a user input corresponding to a first search condition;
searching storage storing records of search targets based on the first search condition and outputting search results corresponding to records that satisfy a set relevance level, wherein the set relevance level indicates a closeness or a similarity of the records to the first search condition, and the records are records whose closeness or similarities to the first search condition are not less than the set relevance level;
when a user operation is input after outputting the search results corresponding to the first search condition, prior to searching using a second search condition, determining whether a range of values of the output search results is widened based on the second search condition; and
in response to a determination that the range of values of the output search results being widened based on the second search condition, decreasing a relevance level that is to be used in a subsequent new search with a second search condition on the basis of the user operation,
wherein the second search condition comprises replacing, by a user, portion of the first search condition with data in a record included in the output search results, and the decreased relevance level that is to be used in the subsequent new search with the second search condition indicates a record closeness or a similarity to the second search condition, and
wherein a first comprehensiveness level of the new search is higher than a second comprehensiveness level of a previous search using a relevance level prior to the decreased relevance level.

2. search system according to claim 1, wherein
the user operation is page feeding or scrolling of a display of search results corresponding to the first search condition, and
the at least one processor is configured to perform:
decreasing the relevance level when the number of attempts of the page feeding or a quantity of the scrolling is more than a predetermined value.

3. search system according to claim 1, wherein
the user operation is an input of the second search condition, and
the at least one processor is configured to perform:
decreasing the relevance level when a range of search results corresponding to the second search condition is not narrowed than that corresponding to the first search condition.

4. The search system according to claim 1, wherein
the at least one processor is configured to perform functioning as a plurality of sub-search units, each of which performs a search using the relevance level, and selecting a sub-search unit in accordance with a set relevance level to perform the searching.

5. A search method, comprising:
receiving a user input corresponding to a first search condition;
searching storage storing records of search targets based on the first search condition and outputting search results corresponding to records that satisfy a set relevance level, wherein the set relevance level indicates a closeness or a similarity of the records to the first search condition, and the records are records whose closeness or similarities to the first search condition are not less than the set relevance level;
when a user operation is input after outputting the search results corresponding to the first search condition, prior to searching using a second search condition, determining whether a range of values of the output search results is widened based on the second search condition; and
in response to a determination that the range of values of the output search results being widened based on the second search condition, decreasing a relevance level that is to be used in a subsequent new search with a second search condition on the basis of the user operation,
wherein the second search condition comprises replacing, by a user, portion of the first search condition with data in a record included in the output search results, and the decreased relevance level that is to be used in the subsequent new search with the second search condition indicates a record closeness or a similarity to the second search condition, and
wherein a first comprehensiveness level of the new search is higher than a second comprehensiveness level of a previous search using a relevance level prior to the decreased relevance level.

6. The search method according to claim 5, wherein
the user operation is page feeding or scrolling of a display of search results corresponding to the first search condition, and
the search method comprises:
decreasing the relevance level when the number of attempts of the page feeding or a quantity of the scrolling is more than a predetermined value.

7. The search method according to claim 5, wherein
the user operation is an input of the second search condition, and
the search method comprises:
decreasing the relevance level when a range of search results corresponding to the second search condition is not narrowed than that corresponding to the first search condition.

8. The search method according to claim 5, wherein
selecting one sub-search unit from a plurality of sub-search units, each of which performing a search using the relevance level in accordance with a set relevance level to perform the searching.

9. A non-transitory recording medium storing a program, the program causing a computer perform:
receiving a user input corresponding to a first search condition;
searching storage storing records of search targets based on the first search condition and outputting search results corresponding to records that satisfy a set relevance level, wherein the set relevance level indicates a closeness or a similarity of the records to the first search condition, and the records are records whose closeness or similarities to the first search condition are not less than the set relevance level;
when a user operation is input after outputting the search results corresponding to the first search condition, prior to searching using a second search condition, determining whether a range of values of the output search results is widened based on the second search condition; and
in response to a determination that the range of values of the output search results being widened based on the second search condition, decreasing a relevance level that is to be used in a subsequent new search with a second search condition on the basis of the user operation,
wherein the second search condition comprises replacing, by a user, portion of the first search condition with data in a record included in the output search results, and the decreased relevance level that is to be used in the subsequent new search with the second search condition indicates a record closeness or a similarity to the second search condition, and
wherein a first comprehensiveness level of the new search is higher than a second comprehensiveness level of a previous search using a relevance level prior to the decreased relevance level.

10. The non-transitory recording medium according to claim 9, wherein
the user operation is page feeding or scrolling of a display of search results corresponding to the first search condition, and
the program causes the computer perform:
decreasing the relevance level when the number of attempts of the page feeding or a quantity of the scrolling is more than a predetermined value.

11. The non-transitory recording medium according to claim 9, wherein
the user operation is an input of the second search condition, and
the program causes the computer perform:
decreasing the relevance level when a range of search results corresponding to the second search condition is not narrowed than that corresponding to the first search condition.

12. The non-transitory recording medium according to claim 9, wherein
the program causes the computer perform:
selecting one sub-search unit from a plurality of sub-search units, each of which performing a search using the relevance level in accordance with a set relevance level to perform the searching.

* * * * *